J. A. SWINEHART.
MEANS FOR MAKING RUBBER TIRES.
APPLICATION FILED FEB. 2, 1918.
1,276,592.
Patented Aug. 20, 1918.
3 SHEETS—SHEET 1.
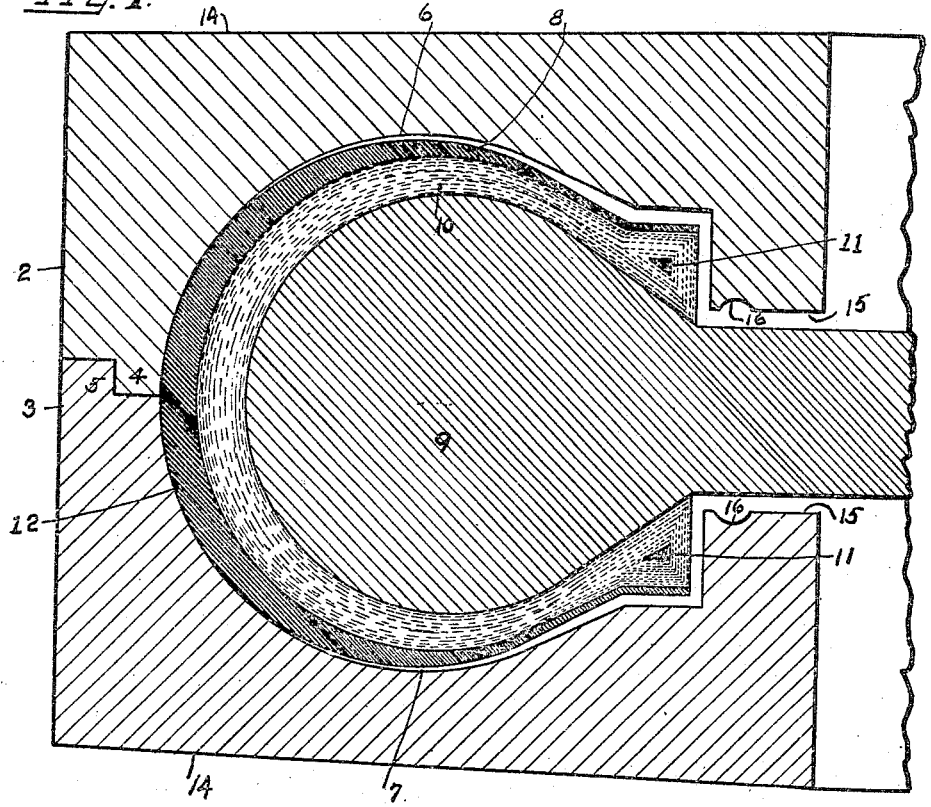
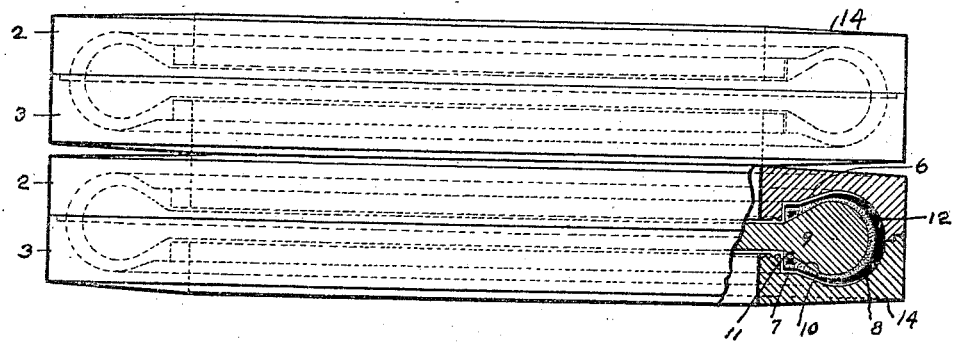
Inventor
J. A. SWINEHART.
Witness
Geo. E. Krecker.
By Fisher & Mosser
Attorneys J. A. SWINEHART.
MEANS FOR MAKING RUBBER TIRES.
APPLICATION FILED FEB. 2, 1918.
1,276,592.
Patented Aug. 20, 1918.
3 SHEETS—SHEET 2.
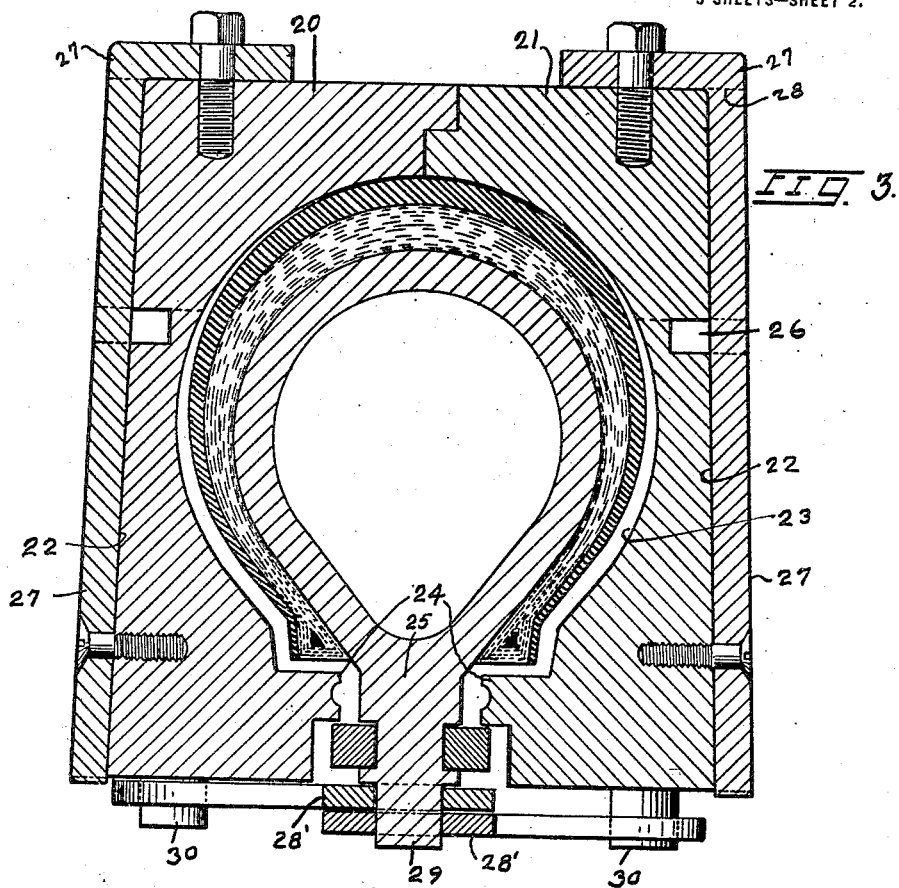
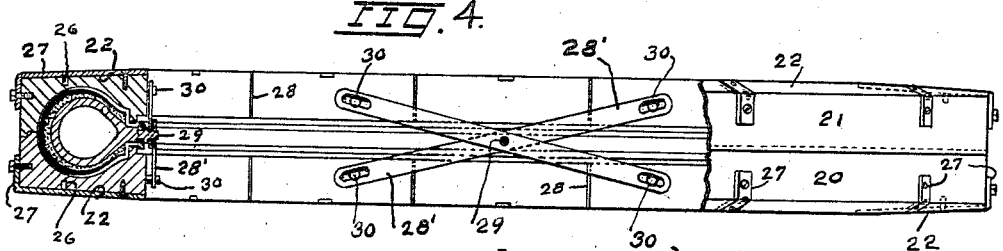
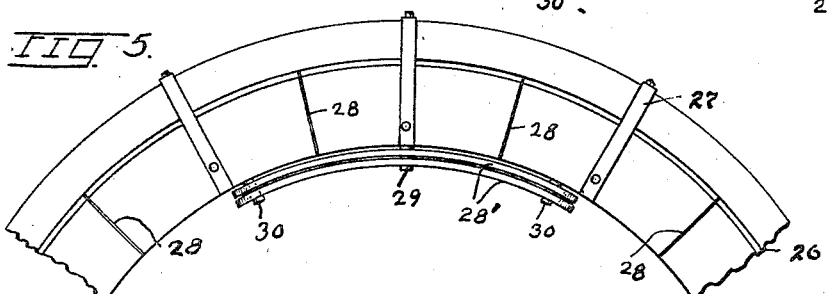
J. A. SWINEHART.
Attorneys

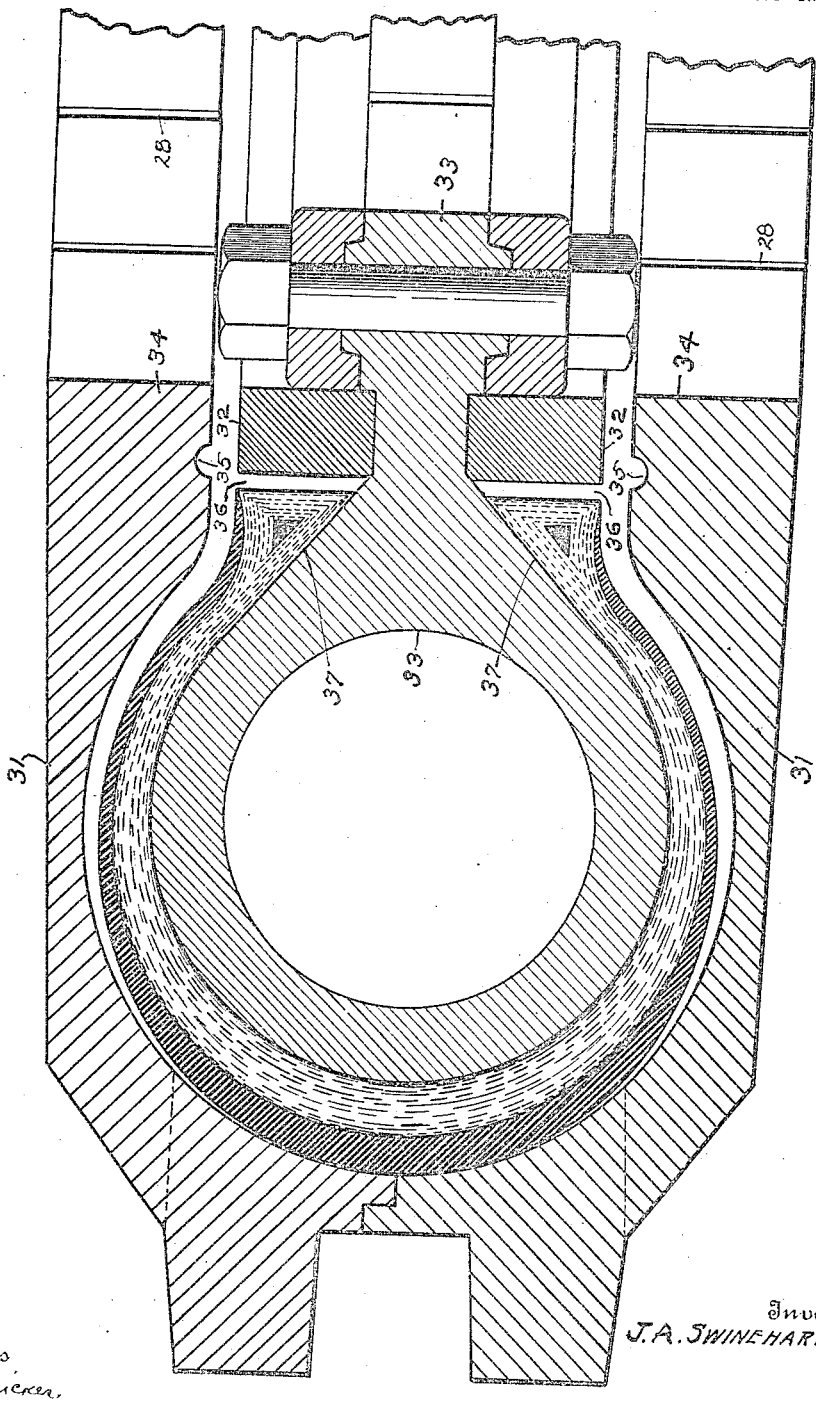

UNITED STATES PATENT OFFICE.

JAMES A. SWINEHART, OF AKRON, OHIO.

MEANS FOR MAKING RUBBER TIRES.

1,276,592.  Specification of Letters Patent.  Patented Aug. 20, 1918.

Application filed February 2, 1918. Serial No. 215,032.

*To all whom it may concern:*

Be it known that I, JAMES A. SWINEHART, citizen of the United States, residing at Akron, in the county of Summit and State of Ohio, have invented certain new and useful Improvements in Means for Making Rubber Tires, of which the following is a specification.

My invention pertains to an improved means for making rubber tires, the primary object being to prevent the formation of folds, buckles, or seams in the fabric or cord carcass of a tire during the steps taken in treating the carcass or vulcanizing the rubber tread upon such carcass within a metal mold. The general practice in molding a tire, is to build up the tire on a core and place the tire and core between two annular mold sections and then apply pressure to the sections to bring them together uniformly at all points in their meeting faces. This action compresses the rubber within the mold and crowds it toward the tread parting line between the mold sections, thereby frequently producing folds and buckles in the tread portion of the carcass to the great detriment to the tire. My conception, stated briefly, is to use two mold sections and a core and impart a graduated pressure to a tire or tire casing comprising rubber and fabric or cords, beginning at the tread portion of the tire and moving toward and to the base or bead portions of the tire, in this way pressing the rubber and the fabric jointly on opposite sides of the core toward the axis of the mold and the core, thereby stretching the fabric and preventing a buckling or folding of the carcass in the arch or tread portion of the tire. The action compares favorably to that of an ironing movement applied to the carcass by two mold sections moving in opposite directions from a common starting point at the tread, the movement progressing around a substantially round core toward a common point approximately diametrically opposite the place of beginning. Obviously, the surplus rubber, if any, is forced to find its outlet at the bottom of the wing or bead portions of the tire, and the fabric if it stretches in any measure moves toward the base or bead portions of the tire. Furthermore, my conception involves the use of specially constructed mold sections adapted to be expanded and contracted for the purpose described, and also the use of equalizing means to produce a uniform movement of the mold sections relatively to the core and each other, all as hereinafter more particularly described.

In the accompanying drawings, Figure 1 is a cross section of a mold made entirely of spring metal to produce a tire according to my concept and showing a core and a tire therein. Fig. 2 is a side view of two such molds as shown in Fig. 1, but on a smaller scale, and superimposed in the relation as used in a vulcanizing press. Fig. 3 is an enlarged view, corresponding to Fig. 1, of a sectional mold and core made of cast iron and provided with means to produce an equalizing movement between the two sections of the mold. Fig. 4 is a side view and section on a smaller scale of the mold shown in Fig. 3, and Fig. 5 is a plan view of a segmentary part of the mold shown in Fig. 4. Fig. 6 is a cross section of a further modification of a mold.

Referring first to Figs. 1 and 2, the mold shown therein consists of two annular mold sections 2 and 3, having interlocking shoulders 4 and 5, respectively, at their outer circumference or larger diameter and provided with annular molding channels 6 and 7, respectively, oppositely disposed and of a given shape and outline corresponding to the exterior surface of the tire or tire casing to be molded. Obviously, the shape of the mold determines the shape of the tire, and to illustrate my invention I show the mold patterned to make one of the more common and accepted forms of tires 8, and also show a core 9 of corresponding shape and which core may be solid or hollow or collapsible and constructed in any practical way for the purpose in hand. The tires in general use comprise a carcass 10 built up of woven fabric or cords impregnated or coated with rubber and formed into a circular shape. This carcass is generally of greater thickness at the tread than at the sides which terminate in beaded extremities 11 and form free wings and a seating base for the tire. This carcass may be treated alone, but the more general practice is to treat it together with a rubber tread 12 of substantial thickness. This tread is usually thicker at the center and gradually tapering and overlapping the sides of the carcass more or less, and sometimes extending to and inclosing the bead portions of the carcass. It is also customary to embody breaker strips of fabric or other reinforcements in the tread portion of the tire, and to mold the rubber tread into irregular shapes and designs to improve the ornamental appearance and traction qualities of the tire.

Having a tire of substantially these characteristics the proposition then is to vulcanize the rubber embodied within and upon the carcass. In so doing and using molds as made heretofore, the irregular shape of the tire and mold and the placement of the core in eccentric relation to the mold channels causes the rubber and fabric to be moved and crowded in the direction of the tread and parting line between the molds at the tread, and the practice has been to permit the rubber to overflow into suitable overflow channels at such tread parting line, thus increasing the tendency, if anything, to bring about a movement of the rubber and fabric in that common direction. The result has been that buckles, folds or creases are produced in the fabric, the softened rubber contained within the fabric or between the plies of fabric being also conducive to the displacement of the fabric under the pressure imparted to the molds and to the tire therein. I overcome this serious objection by forming the mold sections so that they may come into seating and interlocking engagement at the shoulders 4 and 5 before bringing any substantial compression upon the rubber tread and carcass, and also make each mold section with a sloping outer face 14, so that when the two sections are assembled, the complete mold is slightly thicker at its center or inner circumference than at its outer circumference. Each mold is in the form of an annular dished plate having the outward appearance of a shallow truncated cone, and when both sections are placed together the opposed molding faces are seen to lie in reversely-inclined planes. However, the mold chambers 6 and 7 in the respective sections are made of the same or substantially the same size as heretofore, with the exception possibly, that a slightly larger space may be provided opposite that portion of the mold which forms the base or bottom of the tire. When assembled, the inner molding surface 15 of each section will be spaced apart from the core 9 on diverging lines and incapable of producing the correct shape of tire except and until compressed to the maximum toward and against the core. Thus, it occurs that when the sections are first placed in engaging relation at the shoulders 4 and 5 the curvature of the molding channel at each side of the median or parting line is such that a graduated space is provided opposite the rounded side of the core with the maximum amount of space opposite the bead-forming portions of the mold, and if there be a tire upon the core each section is slightly inclined relatively thereto and to a median horizontal line with the greatest amount of space at the inner circumference of such sections. It follows, therefore, that upon imparting pressure to one pair of mold sections or a plurality of such molds superimposed in a suitable vulcanizing press wherein a vulcanizing heat is maintained, the sections will be gradually flattened and compression will begin at the periphery or outer circumference of the tire and annularly of the tire and be gradually distributed to the remaining portions of the tire by a movement progressing on radial lines in the direction of each base or bead portion of the tire, thus tending to force the arched portion of the carcass against the core at all points therearound and with a movement inwardly toward the axis of the mold and the core, thereby smoothing or stretching the fabric inwardly toward the axis of the mold and preventing the formation of buckles or creases in the tread portion of the carcass. The movement may be relatively slight, but even under such circumstances, the pressing action as described works to counteract and prevent a movement of the fabric toward the tread and consequently prevents the formation of folds or creases in the fabric opposite the tread. Furthermore and assuming that there is a surplus of rubber, the graduated pressure imparted by the sloping mold sections tends to crowd the surplus rubber toward the points of least resistance, that is, toward the open space opposite the beaded portion of the tire, and if the surplus rubber is in excess of all needs the rubber may be permitted to overflow into an annular recess or overflow channel 16 in the face of each mold section.

The foregoing concisely describes my steps of molding a carcass or tire according to the basic and underlying principle of my invention, and the mold shown in Figs. 1 and 2 may be made of spring metal so that each circular mold section has the inherent characteristic of yielding at its inner circumferential portion under pressure imparted to the outside of the mold. On the other hand, such movement cannot be obtained with relatively thick and heavy molds unless the molds are made in segmental form and hinged or faced or made of spring metal and slotted radially. Nor do I wish to limit myself in the practice of the method to any specific instrumentality. I may prefer to make the mold sections of cast metal and provide positive means for keeping the molds apart at the inner circumference thereof prior to applying pressure to the mold, and also provide means for equalizing the movement of the opposite mold sections relatively to the core, and the mold sections may be equipped with means or have an inherent capability adapted to hold the core centrally between the mold sections at all times whether before or during pressing operations. For example, I may make a circular mold as shown in Figs. 3 to 5, inclusive, comprising two annular metal sections 20 and 21 adapted to interlock at their outer circumference, each section being formed with a flat sloping outside face 22 and a channeled tire-molding inner face 23, the latter conforming to the shape of tire desired. Each section may also be provided with a shouldered portion 24 spaced apart from the narrow rim of the hollow core 25 and adapted to engage said rim when said sections are subjected to pressure exerted in a direction longitudinally of the axis of the mold. As shown, each circular mold section 20, 21 has an annular groove 26 in its sloping or conical face near its outer circumference, and the purpose of this groove is to reduce the thickness of the mold section at that point to permit the inner annular portion of the section to flex toward the core upon applying pressure for that purpose. One or more of these annular grooves may be provided, and where cast metal is employed in making the sections I may attach a number of radial spring-steel straps 27 to the sloping face of each section and bridge the groove, and thus secure and reinforce the grooved section and provide the necessary spring tension to spread the sections apart to their original sloping position upon withdrawing the pressure. A series of radial slots or saw cuts 28 may also be made in each section, which slots may extend to a greater or less depth or pass entirely through the metal body, and these slots may also extend from the inner circumference of each section to the groove 26 or beyond. In this way a series of free-flexing segments may be provided at the inner circumference of each section, whereby the mold may be forced shut by pressure exerted laterally on opposite sides of the mold and with a greater degree of movement at the inner circumference of said mold than at the outer circumferential portion thereof.

In practice, a divided mold containing a core and tire, is laid horizontally upon another of the same construction, and in order that the core and tire be maintained always centrally between and spaced uniformly apart from both mold sections and so that a uniform pressure be applied to opposite sides of the tire during compression of the mold while in the press, I provide a number of equalizing devices, each comprising a pair of levers 28' in crossed relation and jointly pivoted upon a round lug or pin 29 extending inwardly from the rim of the core, while the outer ends of said levers are slotted and engaged with pins 30 extending from the inner circumference of the coacting mold sections. These levers are quickly attached and detached and serve to hold the core and tire centrally between the sections, and when the sloping sections are flattened out the pressure is applied uniformly to both sides of the tires, beginning at the tread and moving progressively on radial lines toward the axis of the mold.

In Fig. 6 I show a modified form of mold in which the walls of the two counterpart molding sections 31 are slotted radially and made relatively thin to permit a bending or flexing movement. In addition, a set of separate base rings 32 are provided which may be seated upon the core 33 and spaced apart from the flexible walls 34 of the sections. In this construction, an overflow channel 35 may be located in the inner engaging face of each wall 34 opposite the base ring 32, which is so-called because it is adapted to form the bottom of the tire and provide a base or seat for the base or bead portions of the tire. It will be noted that a slight space 36 is allowed between the tire and ring 32 to accommodate the stretch and movement of the tire down the sloping surfaces 37 of the core in the direction of the rings 32.

What I claim is:

1. A sectional tire mold for use in superposition with other molds in a vulcanizing press, having the molding sections thereof constructed and interconnected to fold toward each other in graduated degree from the tread toward the base portions of the tire upon the application of pressure axially of said mold.

2. A tire mold comprising two annular sections engaged at the outer circumference thereof and spaced apart at the inner circumference thereof and constructed to yield under pressure exerted axially of the mold.

3. A tire mold made in two annular major sections having molding surfaces arranged in sloping relation on opposite sides of a median parting line and constructed to turn toward each other under compression on a point of support at the outer circumference thereof.

4. A tire mold, comprising annular spring sections having tire molding surfaces oppositely disposed in diverging planes.

5. A tire mold, comprising interlocked diverging spring sections having opposed tire molding surfaces.

6. A tire mold, comprising counterpart sections having flexible molding portions disposed oppositely in reversely-inclined planes and compressible toward a common horizontal plane.

7. A tire mold, comprising flexible sections having tire molding surfaces disposed oppositely in diverging planes.

8. A tire mold, comprising annular spring sections having molding surfaces and juxtaposed in reversely inclined planes on opposite sides of a median parting line and capable of altering the position of such surfaces relatively to said median line under compression.

9. A tire mold, comprising an annular section having a tire molding surface normally disposed at an oblique angle to a horizontal plane and having spring walls capable of transient displacement under compression imparted to said section.

10. A tire mold, comprising an annular section having a tire-molding surface and subdivided radially into segmental spring portions capable of transposition to different planes.

11. A tire mold, comprising an annular section having a flexible wall with a tire-molding surface at one side thereof and a sloping face at its other side.

12. A tire mold, comprising an annulus having a tire-molding surface at one side and slotted radially outward from its inner circumference.

13. A tire mold, comprising an annular section having a tire-molding surface at one side and an annular groove and radial spring metal strips at its opposite side.

14. A tire mold, comprising annular sections having flexible walls with molding surfaces oppositely related and positive means connected to the inner circumference of said sections capable of producing a uniform movement of said sections toward a horizontal median line.

15. A tire mold, comprising annular sections having tire-molding surfaces, a core for said mold sections, and means uniting said sections and core capable of equalizing the movements of said parts while the mold is under compressive strains.

16. A tire mold, comprising annular molding sections, a core, and equalizing levers connected with said sections and core.

17. A tire mold, comprising annular molding sections, a core, and equalizing levers detachably connected with the inner circumference of said sections and core.

18. A tire mold, comprising annular sections having molding surfaces and a core in juxtaposition, said surfaces lying in reversely-inclined planes, and centering means for the core connected with said sections.

19. A tire mold, comprising annular sections capable of being interlocked at the outer circumference thereof and compressible toward each other in an annular area inwardly from said outer circumference, in combination with a core for said mold.

20. A tire mold, comprising annular sections having engaging portions at the outer circumference thereof and provided with diverging molding surfaces compressible in a degree toward each other, a core seated centrally between said surfaces, and means capable of equalizing the movement of said sections relatively to said core at the inner circumference of said sections.

Signed at Cleveland, in the county of Cuyahoga, and State of Ohio, this 29th day of January, 1918.

JAMES A. SWINEHART.

Copies of this patent may be obtained for five cents each, by addressing the "Commissioner of Patents Washington, D. C."